United States Patent
Gaikwad et al.

(10) Patent No.: US 9,898,276 B2
(45) Date of Patent: *Feb. 20, 2018

(54) ENTITY WIDE SOFTWARE TRACKING AND MAINTENANCE REPORTING TOOL

(71) Applicant: Bank of America Corporation, Charlotte, NC (US)

(72) Inventors: Deepak Gujaba Gaikwad, Singapore (SG); Kenneth Fogarty, Dagenham (GB)

(73) Assignee: Bank of America Corporation, Charlotte, NC (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/166,518

(22) Filed: May 27, 2016

(65) Prior Publication Data

US 2016/0274908 A1    Sep. 22, 2016

Related U.S. Application Data

(63) Continuation of application No. 14/150,984, filed on Jan. 9, 2014, now Pat. No. 9,417,868.

(51) Int. Cl.
*G06F 9/44* (2006.01)
*G06F 9/45* (2006.01)
(Continued)

(52) U.S. Cl.
CPC ............... *G06F 8/65* (2013.01); *G06F 8/61* (2013.01); *G06F 8/71* (2013.01); *G06F 9/541* (2013.01);
(Continued)

(58) Field of Classification Search
CPC ........ G06F 9/4411; G06F 9/542; G06F 9/541; G06F 9/45512; G06F 11/368;
(Continued)

(56) References Cited

U.S. PATENT DOCUMENTS 5,835,911 A * 11/1998 Nakagawa ................ G06F 8/65
6,035,264 A *  3/2000 Donaldson .......... G06F 9/45512
                                                                702/182
(Continued)

OTHER PUBLICATIONS

John R. Callahan et al., Web_based Issue Tracking for Large Software Projects, Sep.-Oct. 1998, [Retrieved on Oct. 10, 2017]. Retrieved from the internet: <URL: http://ieeexplore.ieee.org/stamp/stamp.jsp?arnumber=722227> 9 Pages (25-33).*

(Continued)

*Primary Examiner* — Thuy Dao
*Assistant Examiner* — Anibal Rivera
(74) *Attorney, Agent, or Firm* — Michael A. Springs; Moore & Van Allen PLLC; Peter B. Stewart

(57) ABSTRACT

Embodiments of the invention are directed to a system, method, or computer program product for providing an entity wide software tracking and maintenance tool for monitoring maintenance and software updates across an entity. As such, the invention provides a uniform and stable method of monitoring software updates and software installation across an entity's information technology infrastructure. The invention receives software updates or new programs for installation across the entity. The invention then creates a tracking module to link to the maintenance update. The tracking module is a self-contained, self-describing module that contains static information related to the maintenance. Subsequently, the tracking module allows users to monitor the progress of maintenance levels. In some embodiments, the user may query the system to determine the progress of a specific maintenance. In some embodiments, the system may automatically notify a user of the success or failure of maintenance at one or more stages.

20 Claims, 7 Drawing Sheets

(51) Int. Cl.
*G06F 9/445* (2018.01)
*G06F 9/54* (2006.01)
*G06F 11/30* (2006.01)
*G06F 11/36* (2006.01)

(52) U.S. Cl.
CPC .............. *G06F 9/542* (2013.01); *G06F 9/547* (2013.01); *G06F 11/3055* (2013.01); *G06F 11/368* (2013.01); *G06F 11/3684* (2013.01)

(58) Field of Classification Search
CPC ............. G06F 11/3672; G06F 11/3055; G06F 11/3684; G06F 11/3688
See application file for complete search history.

(56) References Cited

U.S. PATENT DOCUMENTS

| | | | | |
|---|---|---|---|---|
| 6,466,898 | B1* | 10/2002 | Chan | G06F 17/5022 703/14 |
| 6,691,300 | B1* | 2/2004 | Alexander | G06F 8/65 717/110 |
| 6,725,268 | B1* | 4/2004 | Jackel | H04L 43/0817 709/225 |
| 7,577,701 | B1* | 8/2009 | Johns | H04L 41/0213 709/203 |
| 7,584,467 | B2* | 9/2009 | Wickham | G06F 8/65 717/171 |
| 7,624,394 | B1* | 11/2009 | Christopher, Jr. | G06F 8/61 717/174 |
| 7,716,077 | B1* | 5/2010 | Mikurak | G06Q 10/06 705/7.12 |
| 7,849,184 | B1* | 12/2010 | Kahn | G06F 11/3055 709/224 |
| 8,321,858 | B1* | 11/2012 | Marmaros | G06F 8/65 717/173 |
| 9,143,530 | B2* | 9/2015 | Qureshi | H04L 63/20 |
| 2001/0051928 | A1* | 12/2001 | Brody | G06F 21/16 705/52 |
| 2002/0004824 | A1* | 1/2002 | Cuan | G06F 17/3089 709/208 |
| 2003/0046678 | A1* | 3/2003 | Boxall | G06F 9/4411 717/174 |
| 2003/0074393 | A1* | 4/2003 | Peart | G06F 9/547 709/203 |
| 2004/0093387 | A1* | 5/2004 | Wick | H04L 51/04 709/207 |
| 2004/0143746 | A1* | 7/2004 | Ligeti | G06F 21/10 713/185 |
| 2005/0138376 | A1* | 6/2005 | Fritz | G06F 21/31 713/168 |
| 2006/0179042 | A1* | 8/2006 | Bram | G06N 5/043 |
| 2007/0240118 | A1* | 10/2007 | Keren | G06F 11/3684 717/124 |
| 2008/0172583 | A1* | 7/2008 | Mahajan | G06F 11/0766 714/57 |
| 2008/0201467 | A1* | 8/2008 | Delany | G06F 9/542 709/224 |
| 2009/0094336 | A1* | 4/2009 | Echevarria | G06F 15/16 709/206 |
| 2009/0158272 | A1* | 6/2009 | El-Assir | G06F 8/61 717/177 |
| 2009/0169008 | A1* | 7/2009 | Gonzales | G06F 11/3672 380/270 |
| 2009/0171893 | A1* | 7/2009 | Gonzales | G06F 11/368 |
| 2009/0248806 | A1* | 10/2009 | Teman | G06Q 30/02 709/206 |
| 2009/0327714 | A1* | 12/2009 | Yaghmour | H04L 51/30 713/168 |
| 2010/0162267 | A1* | 6/2010 | Aggarwal | G06F 9/541 719/317 |
| 2011/0087517 | A1* | 4/2011 | Abbott | G05B 23/0283 705/7.28 |
| 2013/0042230 | A1* | 2/2013 | Little | G06F 8/65 717/173 |
| 2013/0080997 | A1* | 3/2013 | Dattathreya | G06F 8/71 717/121 |
| 2015/0106791 | A1* | 4/2015 | Karuppiah | G06F 11/3688 717/127 |

OTHER PUBLICATIONS

Jonathan M. Smith et al., Activating Networks: A progress Report, 1999, [Retrieved on Oct. 10, 2017]. Retrieved from the Internet: <URL: http://ieeexplore.ieee.org/stamp/stamp.jsp?arnumber=755003> 10 Pages (32-41).*

Slinger Jansen et al., Integrated Development and Maintenance of Software Products to Support Efficient Updating of Customer Configurations: A Case Study in Mass Market ERP Software, IEEE 2005, Retrieved on Apr. 19, 2017 from the internet: <http://ieeexplore.ieee.org/stamp/stamp.jsp?arnumber=1510121> 10 Pages (1-10).

Lerina Aversano et al., Introducing Workflow Management in Software Maintenance Processes, 2001, Retrieved on Apr. 19, 2017 from the internet: <http://ieeexplore.ieee.org/stamp/stamp.jsp?arnumber=972757> 10 Pages (1-10).

Valerio Panzica La Manna, Dynamic Software Update for Component-based Distributed Systems, ACM 2011, [Retrieved on Apr. 7, 2016]. Retrieved from the internet: <URL: http://delivery.acm.org/10.1145/2010000/2000294/p1-panzicalamanna.pdf> 8 Pages (1-8).

Mahmoud Hussein et al., Model-driven Update: An Approach to Runtime Evolution of Context-aware Software Systems, Feb. 2012, [Retrieved on Apr. 7, 2016]. Retrieved from the internet: <URL: http://www.ictswin.edu.au/personal/mhussein/papers/C3-516_06.pdf> 29 Pages (1-29).

* cited by examiner

ENTITY WIDE SOFTWARE TRACKING AND MAINTENANCE REPORTING TOOL

CROSS-REFERENCE TO RELATED APPLICATION

This application is a continuation of U.S. patent application Ser. No. 14/150,984, filed Jan. 9, 2014 (Now U.S. Pat. No. 9,417,868), which is hereby incorporated by reference in its entirety.

BACKGROUND

Traditionally, entities have large information technology infrastructures for maintaining computer systems, software, and documents generated or received by the entity. Typically the information technology infrastructure comprises several mainframe servers that include software that requires regular maintenance and upgrading to ensure proper performance.

Each entity may have one or more database management systems (such as relational database management systems) designated to serve one or more different operating system platforms within an entity. Of course, with the advancement technology each part of the information technology infrastructure, such as the software, management systems, operating systems, or the like need to be regularly maintained and upgraded.

Various vendors may provide maintenance and/or upgrades to the parts of the information technology infrastructure. Many of the maintenance and/or upgrades are directed from a vendor and are products such as software designed to integrate into that vendor's parts of the information technology infrastructure deployed at the entity. As such, each software upgrade has a program name, run time, update function and the like specific for that vendor.

In a large entity with many mainframe servers, it may take several days/weeks/months to apply one maintenance fix onto each environment. As such, over a period of time, multiple maintenance fixes may be being implemented at different stages at the same time. Since each maintenance fix or upgrade is implemented from a different vendor, at a different stage, or from a different part of the entity there are different processes, different ways of working, different ways of recording the maintenance information, and the like. In this way, querying maintenance status on any given infrastructure product becomes very person-dependent. Thus only the agent working on the maintenance may have knowledge of the maintenance information and status.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the present invention address the above needs and/or achieve other advantages by providing apparatus (e.g., a system, computer program product, and/or other devices) and methods for providing an entity wide software tracking and maintenance reporting tool that removes the complexity and disparate processes in maintenance and software updates across an entity to provide a uniform and stable method of providing maintenance and tracking the same across the entire entity.

Currently, large entities have large information technology infrastructures, which include large mainframe environments. These environments may include multiple logical partitions, database management systems, and the like. As such, multiple maintenance rollouts may occur at different phases within the mainframe environment's multiple logical partitions. Furthermore, in a large mainframe environment, there are typically multiple copies of the software libraries all with different maintenance required with no easy way of knowing the specific maintenance level of the software contained in each of the libraries.

In the current maintenance environment, keeping track of the progress and/or status of the maintenance for each system is performed manually. The manual tracking of maintenance for each system is then combined with the other manual tracking of maintenance for each of the other systems associated with the large entity to give an overview of the tracking and reporting of maintenance within the entire entity's information technology infrastructure.

As such, the present invention providing an entity wide software tracking and maintenance tool that removes the complexity and different processes in maintenance and software updates across an entity to provide a uniform and stable method of providing maintenance and tracking the same across the entire entity. As such, anyone within the entity may be able to track maintenance across the entity in a unified location. Furthermore, the various groups that provide maintenance to the one or more various mainframe environments may have a common process with consistent methodology to accurately report on maintenance levels per product, system, logical partition, or the like.

In some embodiments, the system may receive maintenance updates from a vendor or that are created by the entity for the entity. These maintenance updates may be for one or more systems, mainframes, partitions, or the like associated with the entity. The maintenance update may include one or more new software program installations, software updates, patches, fixes, new versions, or the like.

In some embodiments, once the maintenance updates are received, the location to incorporate the maintenance updates within the information technology infrastructure of the entity is identified. As such, a maintenance fix may be received from a vendor for specific programs ran by the entity. The entity may determine which of the mainframes or partitions are include the programs needing the maintenance fix.

In some embodiments, a tracking module is coded for the particular maintenance update. As such, a tracking module may be generated and assembled or linked to maintenance update prior to implementing the maintenance update. The tracking module may include specific static information relating to the maintenance update may be inputted. Furthermore, specific data about the date and time of the maintenance fix upload as well as the agent uploading the maintenance fix may be coded into the tracking module. The tracking module may also allow a user to include an entity specific nomenclature to the maintenance fix. This way, the naming of the maintenance fix is established by the entity for uniformity instead of simply the naming that the vendor utilizes. This way it is easier for the system to track the maintenance within the entity.

In some embodiments, the tracking module may then be inserted into the maintenance update. As such, the invention incorporates a module into a vendor provided maintenance update prior to dispersing the maintenance update out to the entity's information technology infrastructure.

Subsequently, the maintenance update along with the tracking module may be installed into the proper location within the entity, such as one or more systems, mainframes, partitions, or the like associated with the entity.

In some embodiments, providing the tracking module with the maintenance update allows the tracking module to track the status of the maintenance process. In this way, a user or user of a network system within the entity may be provided a record of each maintenance update and the process associated therewith by querying the tracking module associated with the maintenance update. In some embodiments, the invention also provides automatic updates on the maintenance process. In this way, a user or network system user may receive periodic updates as to the status of one or more maintenance updates occurring at any given time. As such, part of that code that was created via the tracking module may include a list of one or more users that the system may automatically contact at various stages associated with the update. In this way, at each stage, a user may be aware of the update, the process, and if there are any errors associated with the update installation.

Embodiments of the invention relate to systems, methods, and computer program products for entity wide software tracking and monitoring, the invention comprising: receiving maintenance update products from one or more vendors; generating tracking modules for the maintenance update products, wherein one tracking module is designated to each maintenance update product from the one or more vendors; allowing user input of maintenance information into scripting language of the tracking module designated to the maintenance update product; incorporating the tracking module into the maintenance update product and apply maintenance update to appropriate location within the entity information technology infrastructure; executing the tracking module incorporated into the maintenance update product, wherein executing the tracking module allows the tracking module to communicate a progress of the maintenance update that the tracking module is incorporated therewith; generating a report of the progress of the maintenance update based on the executed tracking module for each of one or more maintenance update products applied within the entity; and providing the user with the report of the progress of the maintenance update associated with the tracking module, wherein the provided report is based on a user query for the report or user input of maintenance information into the scripting language of the tracking module.

In some embodiments, the invention further comprises presenting the user with an interface to query one or more maintenance updates in progress within the entity, wherein querying the one or more maintenance updates provides the user with the report for the progress of the maintenance update associated with the tracking module of the query.

In some embodiments, the user input of maintenance information into scripting language of the tracking modules includes contact information for an individual to receive, automatically, the generated report for the progress of the maintenance update.

In some embodiments, the invention further comprises presenting the user with an interface to query one or more maintenance updates in progress within the entity, wherein the interface provides the user with medium to search the entity for the progress of one or more maintenance updates occurring within the entity.

In some embodiments, the invention further comprises creating an entity internal standard name for the maintenance update product with the incorporated tracking module, wherein the entity internal standard name is a file name coded for entity recognition and retention.

In some embodiments, the tracking module is a self-contained, self-describing module assembled and link-edited as part of a job that creates an executable load module in an appropriate run-time library of the maintenance update product.

In some embodiments, the appropriate location within the entity information technology infrastructure includes a logical partition on a mainframe associated with the entity.

In some embodiments, the maintenance updates include entity created or vendor provided software updates, fixes, or patches for the software running within the entity information technology infrastructure.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
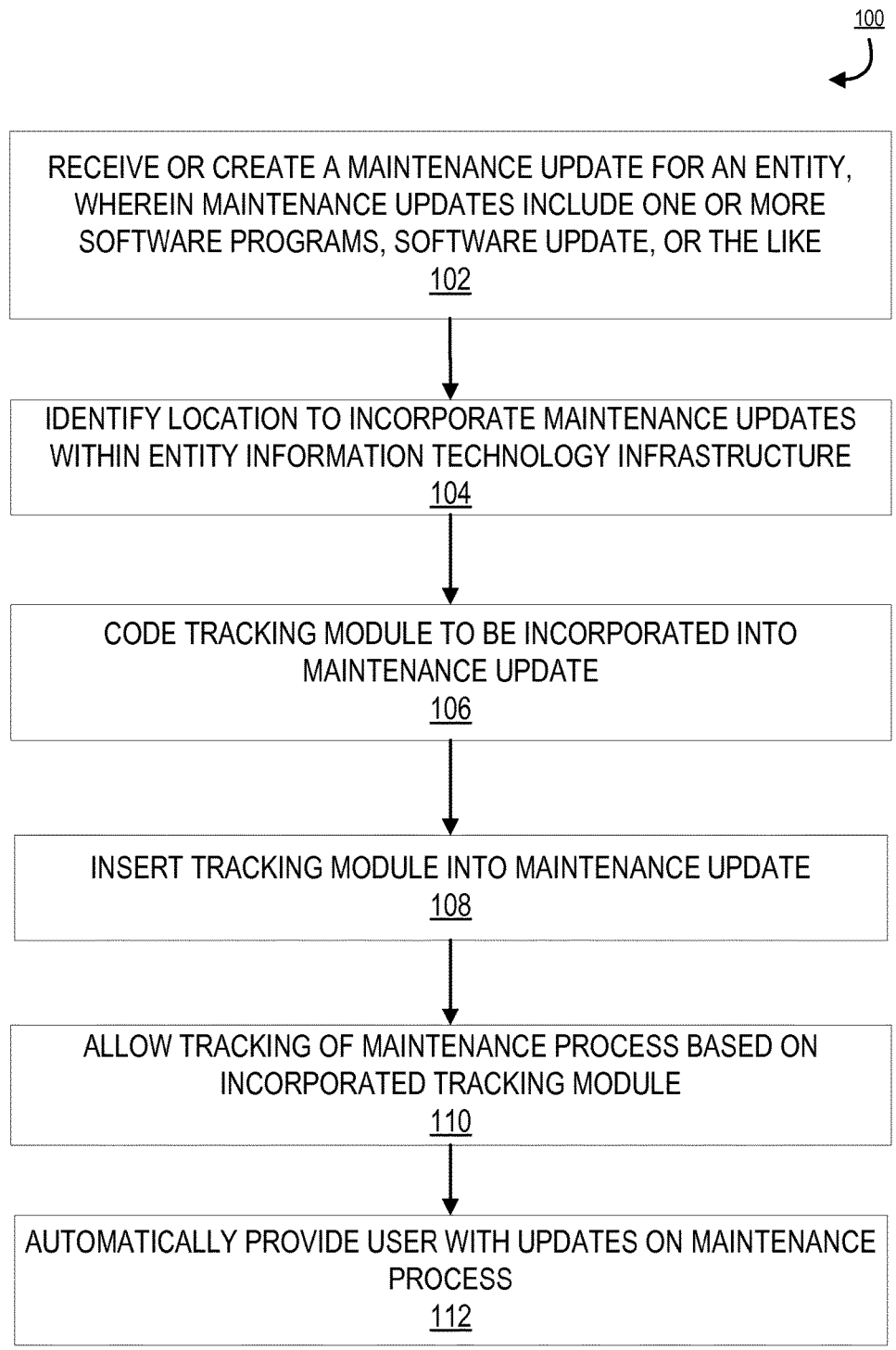
Figure 2:
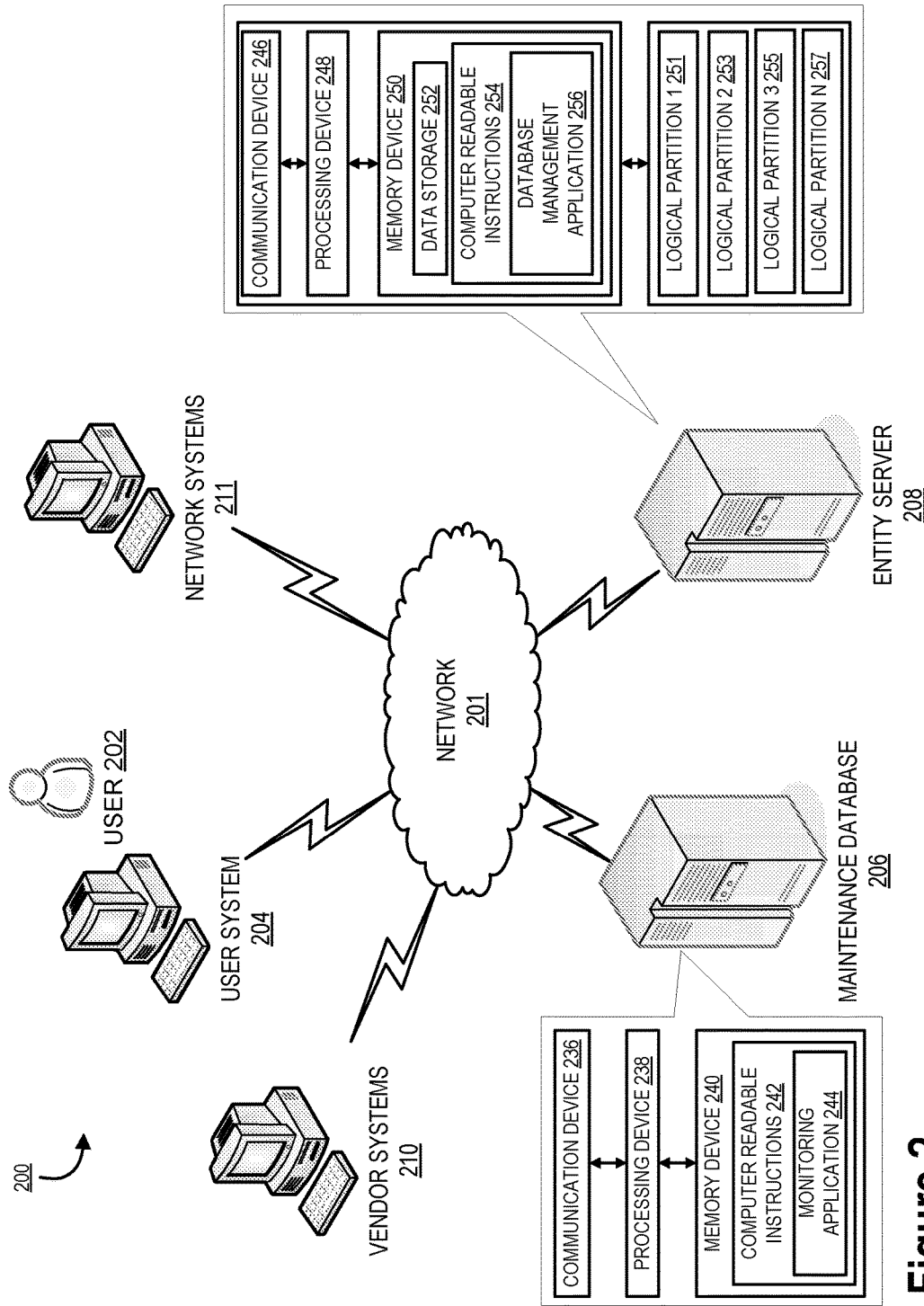
Figure 3:
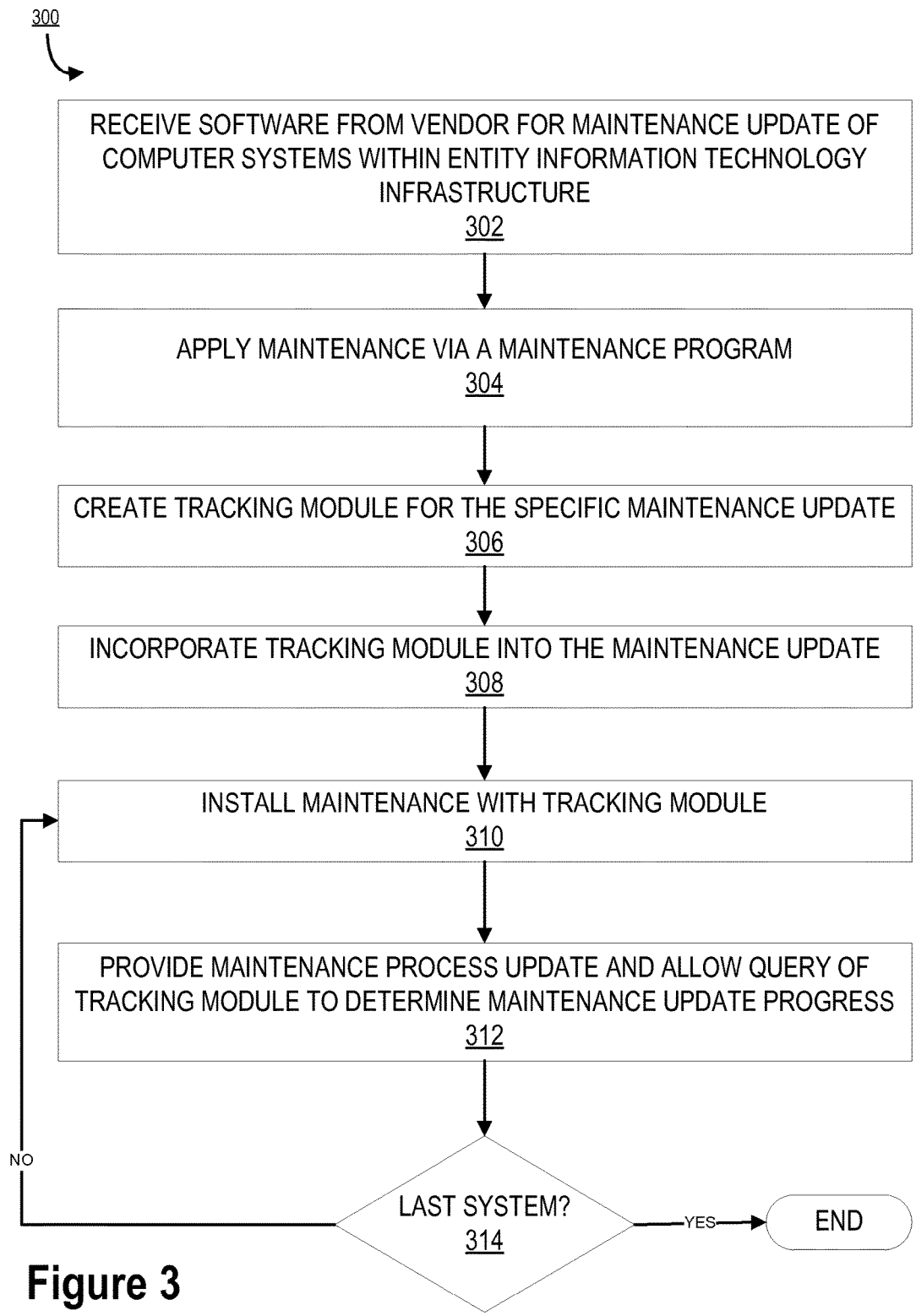
Figure 4:
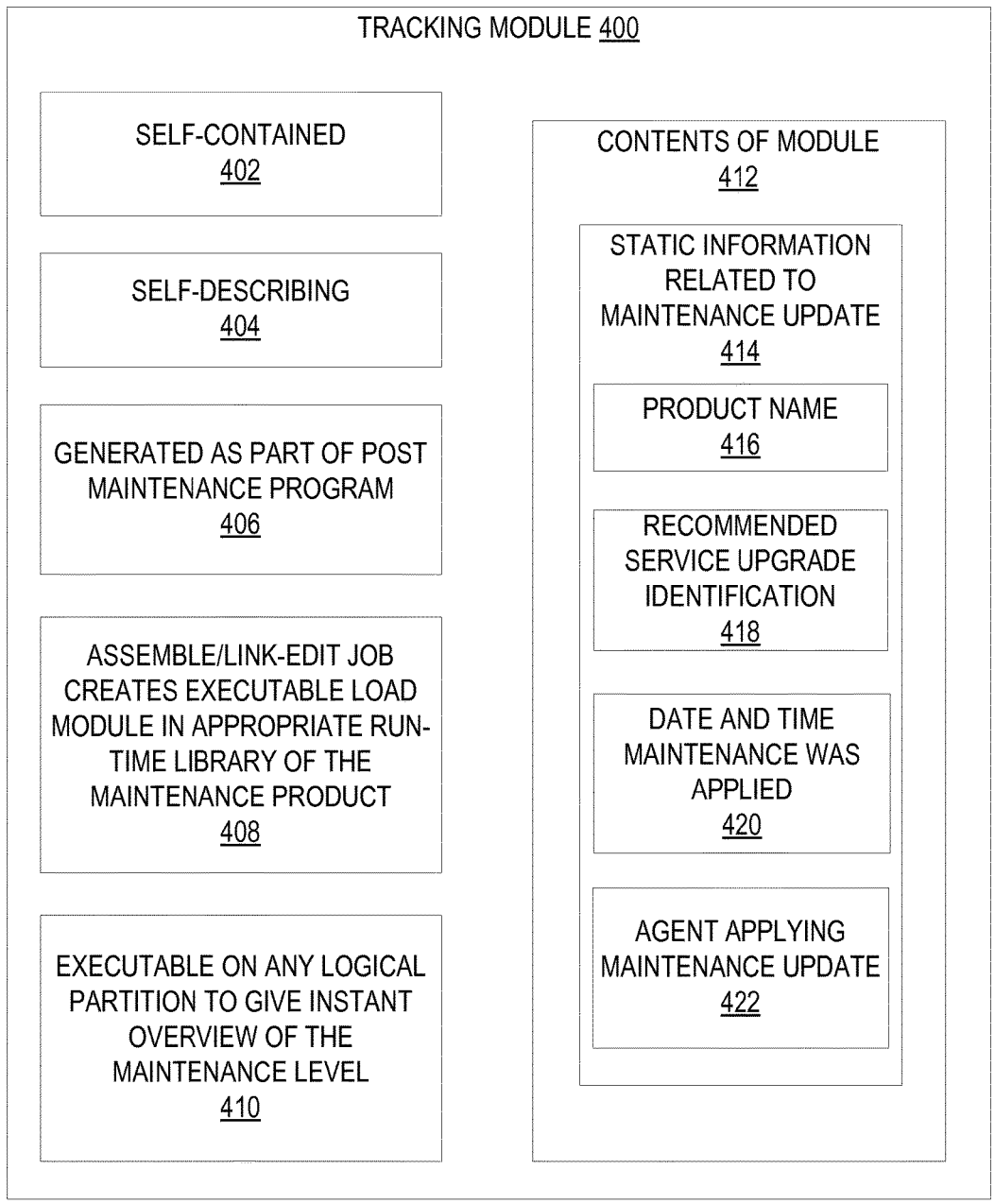
Figure 5:
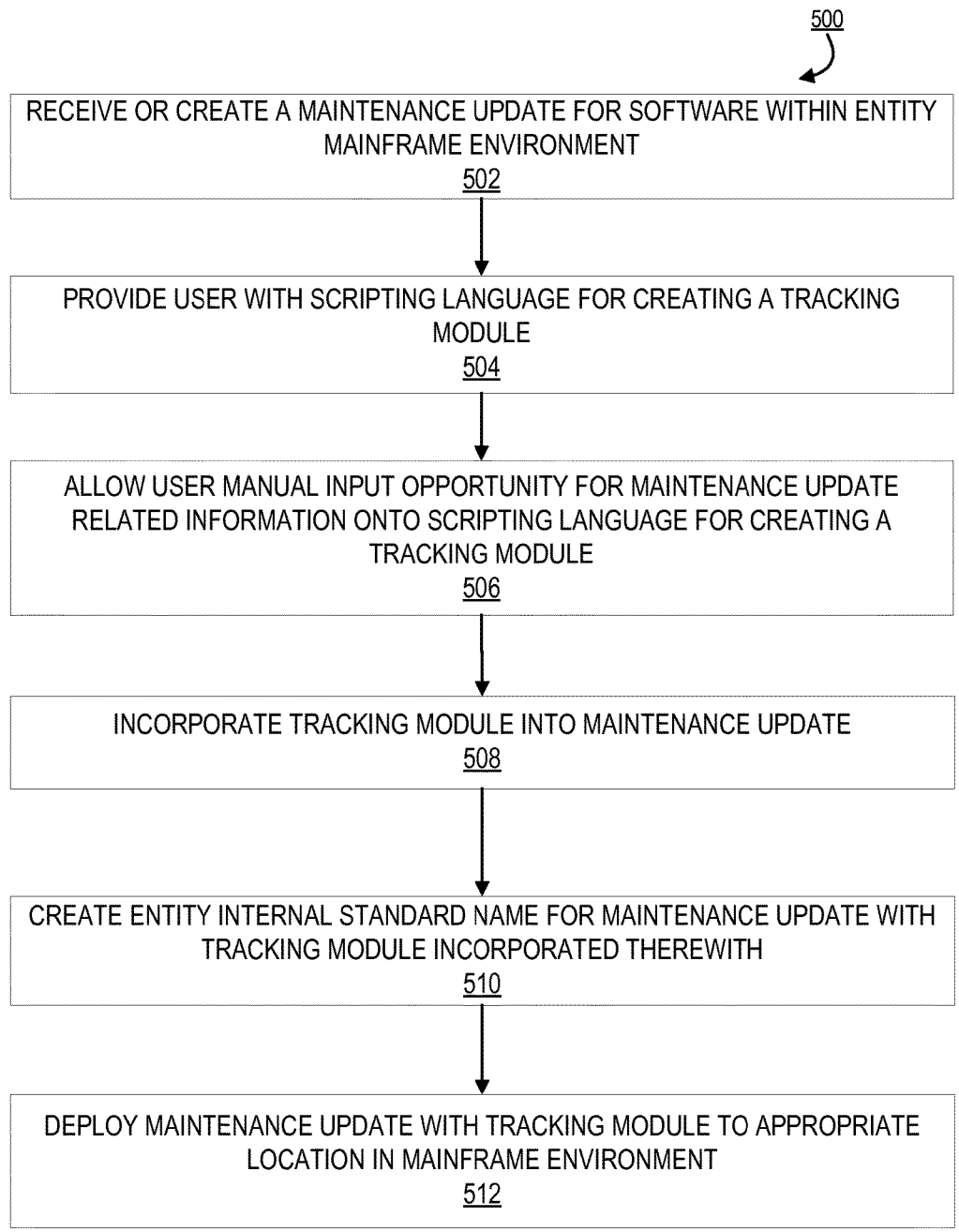
Figure 6:
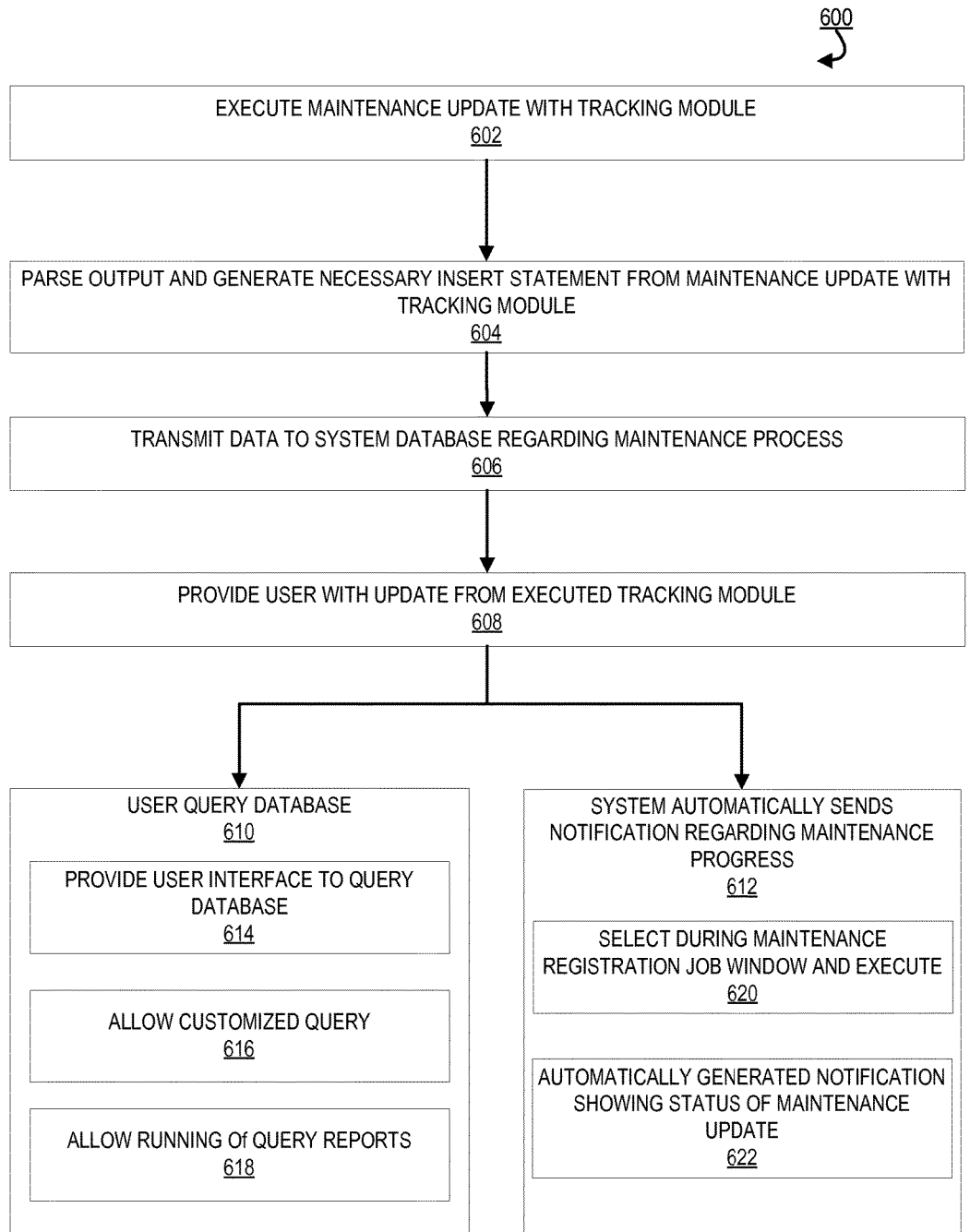
Figure 7:
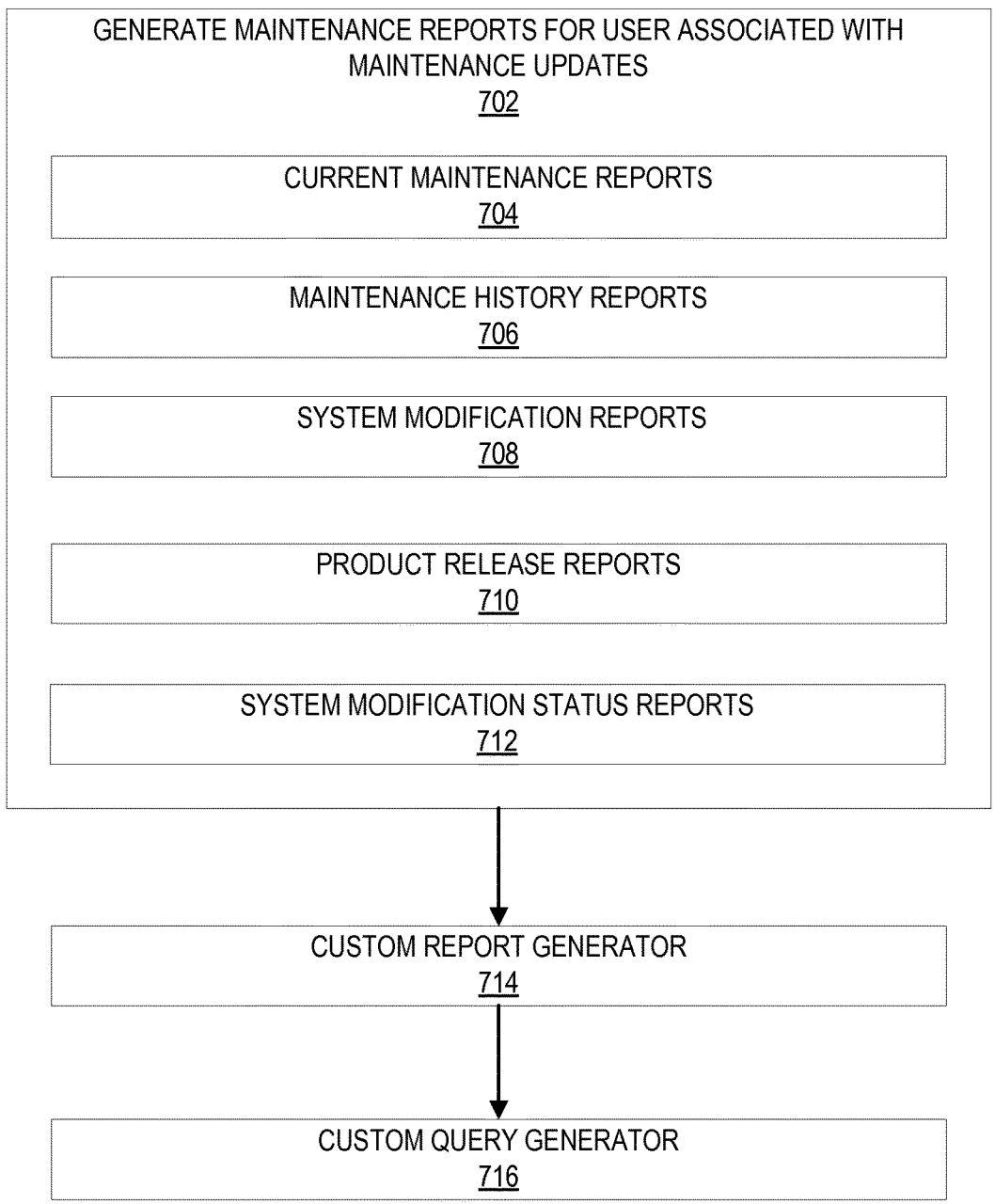

Having thus described embodiments of the invention in general terms, reference will now be made the accompanying drawings, wherein:

FIG. 1 provides a high level process flow illustrating the process of an entity wide software tracking and maintenance reporting tool, in accordance with embodiments of the invention;

FIG. 2 provides an illustration of an entity wide software tracking and maintenance reporting tool system environment, in accordance with various embodiments of the invention;

FIG. 3 provides a high level process flow illustrating the process of creating and adding the entity wide software tracking and maintenance reporting tool to a maintenance process, in accordance with embodiments of the invention;

FIG. 4 provides an illustration of a tracking module, in accordance with an embodiment of the invention;

FIG. 5 provides an illustration of the process of creating and adding a tracking module for a specific maintenance process for entity wide software tracking and maintenance reporting, in accordance with embodiments of the invention;

FIG. 6 provides an illustration of the process of executing a maintenance update with the software tracking and maintenance reporting tool associated therewith, in accordance with embodiments of the invention; and FIG. 7 provides an illustration of automatic generations of maintenance reports, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a"

and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user" or "agent." It will be appreciated by someone with ordinary skill in the art that the user may be an individual, financial institution, corporation, or other entity that may have been involved in the installation of software maintenance and/or wishes to view the progress of a maintenance deployment within the entity providing the system.

The term "maintenance update" or "maintenance fix" or "maintenance" as used herein may refer to any software installation or update that may occur within an entity. This may include any updates, patches, fixes, programs, new installations, new versions, or the like. The software may be installed in or for any portion of the entity. This may include installation in any portion of an entity's information technology infrastructure, which may include any mainframe environment, logical partition, database systems, software libraries, or the like. Furthermore, at any given time one or more maintenance rollouts may occur at different phases within the entity.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of entities that have software installation and updated requirements.

In accordance with embodiments of the invention, the term "information technology" as used herein refers to the totality of interconnecting hardware and software that supports the flow and processing of information. Information technology include all information technology resources, physical components, and the like that make up the computing, internet communications, networking, transmission media, or the like of an entity.

Currently, large entities have large information technology infrastructures, which include large mainframe environments. These environments may include multiple logical partitions, database management systems, and the like. As such, multiple maintenance rollouts may occur at different phases within the mainframe environment's multiple logical partitions. Furthermore, in a large mainframe environment, there are typically multiple copies of the software libraries all with different maintenance required with no easy way of knowing the specific maintenance level of the software contained in each of the libraries. Typically, individual groups within the entity may keep track of their individual maintenance rollouts. However, tracking maintenance rollouts across several groups within an entity is challenging because each group has its own way of installation and recording of the installation. Furthermore, each group may have significantly different software associated with that group. As such, keeping track of the progress and/or status of the maintenance for each system is performed manually. The manual tracking of maintenance for each group is then combined with the other manual tracking of maintenance for other groups across the entity to attempt to provide overview of the tracking and reporting of maintenance within the entire entity's information technology infrastructure. However, this manual input requires time and is out of date with respect to maintenance shortly after input.

As such, the present invention providing an entity wide software tracking and maintenance tool that removes the complexity and different processes in maintenance and software updates across the groups of an entity to provide a uniform and stable method of providing maintenance and tracking the same across the entire entity. As such, anyone within the entity may be able to track maintenance across the entity in a unified location.

FIG. 1 provides a high level process flow illustrating the process of an entity wide software tracking and maintenance reporting tool 100, in accordance with embodiments of the invention. As illustrated in block 102, the process 100 is initiated when a maintenance update is received from a vendor or is created for the entity. This maintenance update may be for one or more systems, mainframes, partitions, or the like associated with the entity. The maintenance update may include one or more new software program installations, software updates, patches, fixes, new versions, or the like.

Next, as illustrated in block 104, the process 100 continues to identify the location to incorporate the maintenance updates within the information technology infrastructure of the entity. As such, a maintenance fix may be received from a vendor for specific programs ran by the entity. The entity may determine which of the mainframes or partitions are include the programs needing the maintenance fix. Next, as illustrated in block 106, a tracking module coded for the particular maintenance update. As such, specific static information relating to the maintenance update may be inputted. Furthermore, specific data about the date and time of the maintenance fix upload as well as the agent uploading the maintenance fix may be coded into the tracking module.

Next, as illustrated in block 108, the coded tracking module may be inserted into the maintenance update. As such, the system may incorporate a module into a vendor provided maintenance update prior to dispersing the maintenance update out to the entity's information technology infrastructure. Subsequently, the maintenance update along with the tracking module may be installed into the proper location within the entity, such as one or more systems, mainframes, partitions, or the like associated with the entity. As illustrated in block 110, the process 100 allows tracking of the maintenance process based on the incorporated tracking module. In this way, a user may be provided a record of each maintenance update and the process associated therewith by querying the tracking module associated with the maintenance update.

Finally, the process 100 completes by automatically providing a user with updates on the maintenance process, as illustrated in block 112. In this way, when coding the tracking module in block 106, part of that code may include a list of one or more users that the system may automatically contact at various stages associated with the update. In this way, at each stage, a user may be aware of the update, the process, and if there are any errors associated with the update installation.

FIG. 2 provides a process flow for an entity wide software tracking and maintenance reporting tool system environment 200, in accordance with various embodiments of the invention. As illustrated in FIG. 2, the entity server 208 (or mainframe) is operatively coupled, via a network 201 to the user system 204, the maintenance database 206, the network systems 211, and the vendor systems 210. In this way, the entity server 208 can send information to and receive information from the user system 204, the maintenance database 206, the network systems 211, and the vendor systems 210 to facilitate the entity wide software tracking and maintenance reporting tool.

FIG. 2 illustrates only one example of an embodiment of an entity wide software tracking and maintenance reporting tool system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual that an affiliation with the entity. In some embodiments, the user 202 may be a programmer or the like associated with maintaining the entity's information technology infrastructure. In this way, the user 202 may be a customer, vendor, or the like of the entity. As such, the user 202 may receive updates or programs for installation across the entity, code tracking modules to be incorporated into the maintenance update, direct the maintenance update to the appropriate location within the entity, and monitor the progress of the maintenance update. In some embodiments, the user 202 may be an individual or business with a relationship with the maintenance of software, systems, and/or programs associated with the entity. Furthermore, multiple individuals or entities may comprise a user 202 to provide maintenance updates to the information technology infrastructure of an entity.

FIG. 2 also illustrates a user system 204. The user system 204 is operatively coupled to the entity server 208, network systems 211, vendor systems 210, and/or the maintenance database 206 through the network 201. The user system 204 has systems with devices the same or similar to the devices described below for the entity server 208 and/or the maintenance database 206 (e.g., communication device, processing device, and memory device). Therefore, the user system 204 may communicate with the entity server 208, network systems 211, vendor systems 210, and/or the maintenance database 206 in the same or similar way as previously described with respect to each system.

The user system 204, in some embodiments, is comprised of systems and devices that allow for a user 202 to receive maintenance updates from a vendor or entity server 208, code tracking modules, deploy maintenance updates into the entity's information technology infrastructure, query maintenance progress, and receive automatic maintenance update progress reports. A "user device" 204 may be any computer communication device or mobile device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, desktop computers, cameras, video recorders, audio/video player, radio, GPS devices, any combination of the aforementioned, or the like. Although only a single user system 204 is depicted in FIG. 2, the system environment 200 may contain numerous user systems 204, as appreciated by one of ordinary skill in the art.

In some embodiments, the user system 204 may receive maintenance updates from a vendor or the entity server 208. In this way, when a vendor has a fix, update, new product release, or the like, the vendor may communicate via the vendor system 210 the update to the entity, such as to the entity server 208. The communication may be done via the network 201 from the vendor system 210 to the entity sever 208 or user system 204. The user system 204 may receive each of the one or more updates any of the one or more vendors may send the entity. In some embodiments, this may include hundreds of updates a minute/hour/day associated with programs and software the entity may deploy across the entity.

In some embodiments, the user system 204 may be utilized for coding the tracking modules. The user 202 may utilize the user system 204 to generate and or assemble an executable load module in appropriate run-time library of the maintenance product. The user 202 may add additional static information related to the maintenance at this point as well. This static information may include one or more of the product name, recommended service upgrade identification, date and time associated with the update, and the like. Furthermore, the user 202 may utilize the user system 204 to create a new name for the update associated with the entity and not associated with the vendor.

In some embodiments, the user system 204 may assist in deploying maintenance updates into the entity's information technology infrastructure. As such, the user 202 may utilize the user system 204 to deploy the maintenance update received from the vendor system 210 to the network systems 211. Furthermore, the user system 204 may communicate with the maintenance database 206 to compile and store the maintenance updates after they have been deployed. The user system 204 may also be utilized in conjunction with the entity server 208 to deploy the maintenance updates to the various locations within the entity.

In some embodiments, the user system 204 may assist a user in querying the maintenance progress for a maintenance update. In some embodiments, the user 202 may wish to query the maintenance progress for a particular maintenance update, date of update, agent updating, program updated, vendor, or the like. The user system 204 may allow a user 202 to communication with the maintenance database 206 and the entity server 208 in order to search for each of the one or more maintenance updates, and the progress thereof, based on the user's search query.

In some embodiments, the user system 204 may receive automatic maintenance update progress reports. In this way, when the tracking module is coded, the user 202 or other agent of the entity may key in an email or other communication means into the code such that the system may automatically provide the user 202 with updates as to the progress and/or status of the maintenance update.

As illustrated in FIG. 2, the entity server 208 may include a communication device 246, processing device 248, and a memory device 250. The processing device 248 is operatively coupled to the communication device 246 and the memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 248 uses the communication device 246 to communicate with the network 201 and other devices on the network 201, such as, but not limited to the user system 204, vendor system 210, network systems 211, and/or maintenance database 206 over a network 201. As such, the communication device 246 generally comprises a modem, server, or other device for communicating with other devices on the network 201.

The entity server 208 may comprise multiple servers to maintain the entity's information technology infrastructure. There may be one or more logical partitions associated with the entity server 208. As such, maintenance update may include one or more new software program installations, software updates, patches, fixes, new versions, or the like to be provided to logical partitions associated with the entity. In the embodiment illustrated in FIG. 2, the entity server 208 contains logical partition 1 251, logical partition 2 253, logical partition 3 255, and logical partition N 257 within a mainframe.

As further illustrated in FIG. 2, the entity server 208 comprises computer-readable instructions 254 stored in the memory device 250, which in one embodiment includes the computer-readable instructions 254 of a database management application 256. In some embodiments, the memory device 250 includes data storage 252 for storing data related to the database management application 256 including but not limited to data created and/or used by the database management application 256.

In the embodiments illustrated in FIG. 2 and described throughout much of this specification, the database management application 256 receives maintenance updates, maintains entity information technology, processes maintenance updates, and/or reports maintenance processes via the tracking module.

In some embodiments, the database management application 256 receives maintenance updates. The database management application 256 may receive maintenance update from vendors. The maintenance updates may be received from a vendor via one or more vendor systems 210. In this way, when a vendor has a fix, update, new product release, or the like, the vendor may communicate via the vendor system 210 the update to the entity server 208 via the network 201. Each of the one or more updates may be sent directly to the entity server 208 for providing maintenance throughout the entity. As such, the database management application 256 may receive the maintenance update and direct it to the appropriate logical partition associated with the entity sever 208. In some embodiments, the updates may be received by the database management application 256 from one or more locations within the entity.

In some embodiments, the database management application 256 maintains entity information technology. As such, the entity server 208 may provide, maintain, and update any and all software and hardware associated with an entity. As such, the database management application 256 manages all software installations and updates associated with the entity. In this way, the database management application 256 may communicate using the communication device 246 through the network 201 to the network systems 211 associated with agents of the entity. In some embodiments, the database management application 256 may also receive new software or software updates for the entity's logical partitions and software associated with user systems 204 and network systems 211.

When software updates or new software is to be installed on one or more network systems 211, the database management application 256 may also process the maintenance updates. In this way, the database management application 256 may determine the appropriate location for the maintenance update such as a network system 211, logical partition, or the like. Subsequently, the database management application 256 in conjunction with the user system 204 may direct the maintenance update to the appropriate location and initiate the installation of the update. In some embodiments, a user 202 or software engineer may code a tracking module and incorporate the tracking module into the maintenance update from the user system 204. Then the database management application 256 may incorporate the tracking module and maintenance update into the appropriate location within the entity. In this way, the entity server 208 may communicate to the network systems 211 in order to process and initiate maintenance updates that include tracking modules.

Furthermore, the database management application 256 may communicate with the maintenance database 206 to monitor each of the one or more maintenance updates being implemented at any given time and to report the maintenance updates to users or other entity agents monitoring the updates.

As illustrated in FIG. 2, the maintenance database 206 generally comprises a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to the entity server 208, the vendor systems 210, the user system 204, and/or the network systems 211. As such, the communication device 236 generally comprises a modem, server, or other device for communicating with other devices on the network 201.

As further illustrated in FIG. 2, the maintenance database 206 comprises computer-readable instructions 242 stored in the memory device 240, which in one embodiment includes the computer-readable instructions 242 of a monitoring application 244. In some embodiments, the memory device 240 includes database storage for storing data related to the monitoring application 244 including but not limited to data created and/or used by the monitoring application 244.

In the embodiments illustrated in FIG. 2 and described throughout much of this specification, the monitoring application 244 stores the maintenance updates in process and allows for monitoring the maintenance update process. In this way, the monitoring application 244 allows for manual monitoring of the maintenance update process for a specific update and/or the monitoring application 244 provides automatic monitoring of the maintenance update process. Furthermore, the monitoring application 244 provides the user 202 with a centralized interface for reviewing and monitoring one or more maintenance updates. The monitoring application 244 communicates with the entity server 208 and the user systems 204 to store and monitor the maintenance update process. As one of ordinary skill in the art would appreciate, the monitoring application 244 and the maintenance database 206 may be a standalone database and/or be part of the entity server 208.

In some embodiments, the monitoring application 244 may store and provide the user 202 with tracking modules for coding and implementation into the maintenance update. In this way, once a maintenance update is received or created, the monitoring application 244 may communicate with the entity server 208 and the user system 204 to provide a tracking module for that particular maintenance update.

In some embodiments, the monitoring application 244 stores information associated with one or more maintenance updates in progress. In this way, once the update with tracking module is initiated by the user 202 in communication with the entity server 208 via the user system 204, information associated with the maintenance update and progress of the same may be stored. The information associated with the one or more maintenance updates may include a file name, network system 211, time/date of maintenance initiation, particular progress point associated with the update, the installer of the update, the vendor associated with the update, or the like. Furthermore, the monitoring application 244 may communicate with the entity server 208 and user system 204 to continually identify and recognize the status of maintenance updates. As such, the monitoring application 244 may monitor for updates progress including whether the update was successful or not. In this way, the monitoring application 244 may report failed updates or successful updates to an appropriate user 202 or agent for follow up instantly upon the failure or success occurring.

In some embodiments, the monitoring application 244 allows for monitoring the maintenance update process. In this way, the monitoring application 244 allows for manual monitoring of the maintenance update process for a specific update and/or the monitoring application 244 provides automatic monitoring of the maintenance update process. Manually monitoring includes one or more queries of a maintenance update status by one or more users 202, agents, or the like associated with the entity. In this way, the monitoring application 244 may present a user 202 or other agent of the entity with a centralized maintenance update interface to query the progress of any of the maintenance updates being performed at a given time. The user 202 may input one or more search criteria into the interface in order for the monitoring application 244 to search the maintenance database 206 to find the appropriate maintenance update. This information may include a file name, network system 211, time/date of maintenance initiation, particular progress point associated with the update, the installer of the update, the vendor associated with the update, or the like.

In this way, the user 202 may key in one or more search criteria into the presented interface. Once keyed in, the monitoring application 244 may search the maintenance updates in progress and finalized to identify the appropriate maintenance update that the user 202 wishes to review. The monitoring application 244 may retrieve the requested maintenance update. This retrieval may include communicating with the location within the entity that the maintenance request is running in. Retrieving the maintenance update includes searching the entity for the specific tracking module associated with that update. Subsequently, the monitoring application 244 communicates with the tracking module to determine the progress of the update. In this way, the tracking module may continually monitor the progress of the specific maintenance update that the module is coded into. As such, the monitoring application 244, using the tracking module, may instantaneously retrieve any data associated with any maintenance update that includes a coded tracking module associated therewith.

Once the monitoring application 244 is in communication with the tracking module, the monitoring application 244 may present a report to the user 202 based on his/her query. The report may include general data about the progress of the maintenance update, the location of the update, the time it started, the run time, an estimated end time, the vendor, the installer, the other locations the update is located within the entity, and the like. In some embodiments, the generated report may include user 202 selected items about the maintenance update.

In some embodiments, the monitoring application 244 may provide automatic monitoring of the maintenance update process. In this way, the monitoring application 244 may provide reports regarding the status of one or more specific updates to users 202 or other agents automatically. This automatic reporting may be communicated from the monitoring application 244 to the user 202 via the network 201. This automatic report may be generated at a given time point, at a given time interval, at stages of maintenance completion, at success/failure of maintenance, at a user 202 specified times, or the like. The report may be provided via electronic communication means, such as email. This report may provide general information about the progress of the maintenance update, the location of the update, the time it started, the run time, an estimated end time, the vendor, the installer, the other locations the update is located within the entity, and the like FIG. 2 also illustrates a vendor system 210. The vendor system 210 is operatively coupled to the entity server 208, user system 204, network systems 211, and/or the maintenance database 206 through the network 201. The vendor system 210 as systems with devices the same or similar to the devices described for the entity server 208 and/or the maintenance database 206 (e.g., communication device, processing device, and memory device). Therefore, the vendor system 210 may communicate with the entity server 208, user system 204, network systems 211, and/or the maintenance database 206 in the same or similar way as previously described with respect to each system. The vendor system 210, in some embodiments, is comprised of systems and devices that allow for sending updates, patches, fixes, programs, or other software to the entity server 208. In some embodiments, the vendor systems 210 may also generate the maintenance updates for the entity.

FIG. 2 depicts only one vendor system 210 within the computing system environment 200, however, one of ordinary skill in the art will appreciate that a plurality of vendor systems 210 may be communicably linked with the network 201 and the other devices on connected to the network 201, such that each vendor system 210 is communicably linked to the network 201 and the other devices on the network 201.

FIG. 2 also illustrates one or more network systems 211. The network systems 211 are operatively coupled to the entity server 208, user system 204, vendor systems 210, and/or the maintenance database 206 through the network 201. The network systems 211 have systems with devices the same or similar to the devices described for the entity server 208 and/or the maintenance database 206 (e.g., communication device, processing device, and memory device). Therefore, the network systems 211 may communicate with the entity server 208, user system 204, vendor systems 210, and/or the maintenance database 206 in the same or similar way as previously described with respect to each system. The network systems 211, in some embodiments, is comprised of systems and devices that allow for receiving maintenance updates for running software on the network system 211 computer. The network systems 211 are associated with agents or users 202 associated with the entity. In this way, the network systems 211 are computer systems associated with agents, users 202, or the like associated with lines of business, groups, subsidiaries, business partners, or the like associated with the entity.

FIG. 2 depicts only one network system 211 within the computing system environment 200, however, one of ordinary skill in the art will appreciate that a plurality of network systems 211 may be communicably linked with the network 201 and the other devices on connected to the network 201, such that each network system 211 is communicably linked to the network 201 and the other devices on the network 201.

FIG. 3 illustrates a high level process flow of the process of creating and adding the entity wide software tracking and maintenance reporting tool to a maintenance process 300, in accordance with embodiments of the invention. The process 300 is initiated when the software update is received from a vendor for maintenance updating of software within the entity's information technology infrastructure, as illustrated in block 302. Next, as illustrated in block 304 the update is applied or downloaded via a maintenance program. In this way, when a fix is released by a vendor, the process 300 downloads the fix into a data center. The entity utilizes and applied maintenance to download the fix into the data center.

Next, the process 300 continues when a user 202 creates a tracking module for the specific maintenance received in block 302, as illustrated in block 306. As such, a user 202 may create a tracking module that contains all the information about the fix, what the fix is for, for which product, and the like. Furthermore, the tracking module may be provided with an entity specific file name. In this way, the user 202 may manually key in the information to describe the fix into the tracking module. Subsequently, as illustrated in block 308, the tracking module is incorporated into the maintenance update. As such, when the maintenance updated is installed, as illustrated in block 310, the tracking module is incorporated with the maintenance update and travels with the maintenance update where it is installed on any server or any database system.

Next, the process 300 continues when a job is entered which goes and reads the tracking module information and will populate a centralized database. As illustrated in block 312, the maintenance process information received from communicating with the tracking module is provided and the tracking module may be read via a user 202 query to query the progress of the maintenance update. The communication with the tracking module and reading of the tracking module is automatic and captures information about the maintenance update such as, but not limited to, what time the maintenance update was installed, who installed it, the stage of completion, successful/unsuccessful processing, and the like. The information is then inserted into a centralized database and a draft of this is stored in a depository to generate several reports required by the entity and users 202 for various maintenance updates for the entity.

Finally, it is determined if the last system maintenance update is complete, as illustrated in decision block 314. If it is the last system maintenance update, the process 300 ends. If it is not the final system in decision block 314, the process 300 returns to block 300 to install a maintenance update with a tracking module coded thereon.

FIG. 4 illustrates an exemplary tracking module 400, in accordance with an embodiment of the invention. The tracking module 400 is coded for the particular maintenance update. As such, a tracking module 400 may be generated and assembled or linked to maintenance update prior to implementing the maintenance update. In this way, a user 202 may manually code the tracking module 400 to include data associated with the maintenance update.

In this way, the tracking module 400 is a self-contained 402 module that may be communicated with and/or may send information to a user 202 about a maintenance update that the tracking module 400 is associated with. Furthermore, the tracking module 400 is self-describing 404, such that it may send information to a user 202 about a maintenance update that the tracking module 400 is associated with.

In some embodiments, the tracking module 400 is generated as part of a post maintenance program, as illustrated in block 406. In this way, once a maintenance update is received, the tracking module 400 may be coded and generated as part of the post maintenance program. Next, as illustrated in block 408, the tracking module 400 in assembled/link-edited as part of a job that creates an executable load module in an appropriate run-time library of the maintenance update product.

In some embodiments, the tracking module may then be inserted into the maintenance update. As such, the invention incorporates a module into a vendor provided maintenance update prior to dispersing the maintenance update out to the entity's information technology infrastructure. In this way, the maintenance update along with the tracking module 400 that has been incorporated therewith may be installed into the proper location within the entity, such as one or more systems, mainframes, partitions, or the like associated with the entity.

Next, as illustrated in block 410, the tracking module 400 is subsequently executable on any logical partition to give an instant overview of the maintenance level. This overview may be presented to the user 202 via an interface. As such, executing the tracking module 400 on a maintenance update allows the tracking module 400 to track the status of the maintenance process. In this way, a user 202 or user of a network system within the entity may be provided a record of each maintenance update and the process associated therewith by querying the tracking module associated with the maintenance update. In some embodiments, the invention also provides automatic updates on the maintenance process via pre-programmed execution of the tracking module 400. In this way, a user 202 or network system user may receive periodic updates as to the status of one or more maintenance updates occurring at any given time. As such, when the tracking module 400 was generated in block 406, the user 202 may have inputted a list of one or more users that the system may automatically contact at various stages associated with the update. In this way, at each stage, a user 202 may be aware of the update, the process, and if there are any errors associated with the update installation.

The contents of the tracking module 400 are illustrated in block 412. As illustrated in block 414, the tracking module 400 includes static information relating to the maintenance update may be inputted. This data may be specific to the maintenance update that the tracking module 400 is to be associated with. Specifically, this static data 414 may include the product name 416 of the maintenance update. The product name 416 may include a vendor associated with the maintenance product, a file name associated with the maintenance product, a program associated with the maintenance product, or the like. The static information 414 may further include recommended service upgrade identification information, as illustrated in block 418.

Furthermore, specific data about the date and time of the maintenance update was applied, as illustrated in block 420, may be included in the static information related to the maintenance update 414. As illustrated in block 422, the user 202 or agent or user 202 that applied the maintenance update may be included in the static information related to the maintenance update 414. The tracking module may also allow a user 202 to include an entity specific nomenclature to the maintenance update. This way, the naming of the maintenance update is established by the entity for uniformity instead of simply the naming that the vendor utilizes. This way it is easier for the system to track the maintenance within the entity.

FIG. 5 illustrates the process of creating and adding a tracking module for a specific maintenance process for entity wide software tracking and maintenance reporting 500, in accordance with embodiments of the invention. The process 500 is initiated by receiving or creating a maintenance update for software within the mainframe environment, as illustrated in block 502. In some embodiments, a vendor may provide a software product such as a new software program, update for software that the entity already uses associated with the vendor and/or the like. In other embodiments, the entity may create maintenance update for software that is within the entity's mainframe environment.

Next, as illustrated in block 504, the process 500 continues by providing the user 202 with scripting language for creating a tracking module. In this way, as illustrated in block 506, the process 500 continues by allowing the user 202 the opportunity to manually input maintenance update related information onto the scripting language for creating a tracking module. The user 202 may input static information relating to the maintenance update, such as those discussed above with respect to FIG. 4. This data that may be inputted by the user 202 may be specific to the maintenance update that the tracking module is to be associated with. Specifically, these inputs may include the product name of the maintenance update, location, time, date, vendor, or the like associated with the maintenance update.

As illustrated in block 508, once the user 202 has inputted all information and coded the tracking module for the particular maintenance update, the process 500 may continue to incorporate the tracking module into the maintenance update. In some embodiments, the tracking module may be directly incorporated within or attached to the maintenance update such that the tracking module may follow the maintenance update and monitor the progress of the update incorporated therewith the update. In some embodiments, the tracking module may simply tag the maintenance update such that the tracking module may track the progress of the maintenance update via remote signal communication.

Next, as illustrated in block 510, once the tracking module is incorporated into the maintenance update, the process 500 continues to create an internal standard name for the maintenance update with the tracking module incorporated therewith. In this way, the tracking module is no longer named by the vendor, with the vendor's identification information. Instead, the tracking module allows the user 202 to rename the tracking module incorporated with the maintenance update such that it may be named with an entity standard name for entity identification and recognition.

Finally, as illustrated in block 512, the maintenance update may be deployed with the tracking module associated therewith to the appropriate location within the mainframe environment.

FIG. 6 illustrates the process of executing a maintenance update with the software tracking and maintenance reporting tool associated therewith 600, in accordance with embodiments of the invention. The process 600 starts when the maintenance update with the tracking module associated therewith is executed, as illustrated in block 602. In this way, the maintenance update is deployed to the appropriate location within the mainframe environment. In this way, the system provides two maintenance registration jobs, a user query of the database or an automatic system update of the maintenance. A user 202 may provide information such as a product library and/or an email address to receive the maintenance registration job. The maintenance registration job is executing during the maintenance window or while the maintenance upload is taking place.

Next, as illustrated in block 604 the process 600 continues by parsing the output and generating the necessary insert statements from the maintenance update with the tracking module. As such, the maintenance registration job authorizes the execution of the tracking module. Thus, the tracking module may provide an output to the system, the system may parse that output to generate an appropriate insert statement from the tracking module.

Then, as illustrated in block 606, the data from the tracking module may be transmitted to the system database. This data includes information regarding the maintenance process and the progress thereof. As illustrated in block 608, the user 202 may be provided with the data transmitted form block 606 in the form of an update from the executed tracking module. There are two different maintenance registration jobs provided by the system, first the system may provide a user 202 with updates about maintenance based on a user 202 query of the database, as illustrated in block 610 or the system may provide an automatically send notification regarding the maintenance progress, as illustrated in block 612.

In some embodiments, such as the one illustrated in block 610, the system may provide a user 202 with updates about maintenance based on a user 202 query of the database. As illustrated in block 614, the user query of the database 610 initiates by the system providing a user 202 with an interface to query the database. The interface may be provided via the system to the user 202 via a user system or the like. The interface may have one or more searchable criteria associated with the maintenance update or the tracking module. This may include the date, time, file name, user 202 that installed the maintenance update, location of the update, type of update, or the like.

In this way, the interface allows for a customized query, as illustrated in block 616. As such, the user 202 may be able to access and retrieve specific information about the maintenance update. This information may include the status of the maintenance update, the time it was initiated, the expected end time, the location, the user 202 who initiated the job, the run time, or the like.

Finally, as illustrated in block 618, the system via user querying the database 610, allows a user 202 to input and/or program query reports of the maintenance update. In this way, the user 202 may request a report based duration of running of the maintenance update, time of day/week/month/year, specific point in the maintenance upload, or the like.

In some embodiments, such as the one illustrated in block 612, the system may automatically send notification regarding maintenance progress to the user 202 or other individuals associated with the entity. In this way, the user 202 may program into the tracking module to create an automatic report that sends notification to the user 202 or another individual within the entity. These reports may be generated based on day/week/month/year, success/failure of update, milestone of update being reached, or the like. Furthermore, one or more maintenance updates may be presented in a report. In this way, a user 202 may receive a report based on a location received several updated within an entity, a vendor, or the like.

As illustrated in block 620, the automatic notification regarding the maintenance process 612 may be selected during the maintenance registration job window and execution. As such, the user 202 may program the automatic notification to be presented to a user 202 or other individual when the user 202 is creating the tracking module. As such, the user 202 may input an email address or other communication means into the tracking module. The tracking module may then be able to communicate with the user 202 when necessary to generate an automatic notification and send that notification to the email address. Next, as illustrated in block 622 the automatically generate notification may show the status of the maintenance update, such as the success and/or failure of the maintenance update.

FIG. 7 illustrates the process of providing an automatic generation of maintenance reports 700 in accordance with embodiments of the invention. As illustrated in block 702, the system may generate a maintenance report for users or individuals within the entity associated with the maintenance updates. These automatically generated maintenance reports are programmed to be generated by a user 202 via the tracking module when the tracking module was created and attached to a maintenance update. These automatically generated maintenance reports may include current maintenance reports 704. Current maintenance reports 704 include the current status, success/failure, or the like associated with maintenance update. The automatically generated maintenance report may also include maintenance history reports 706. In this way, the report may provide indications of the history of maintenance for that program, computer system, or the like. The automatically generated maintenance report may also include system modification reports, such as those illustrated in block 708. The automatically generated maintenance reports may also include product release reports 710 for the maintenance updates. Finally, the automatically generated maintenance report may also include system modification status reports, as illustrated in block 712.

Next, the system may send the data generated from the tracking module in order to generate the customer report, within the custom report generator, as illustrated in block 714. In this way, the report that the user 202 requested via the tracking module may be generated based on the information received from the tracking module regarding the maintenance update. Finally, as illustrated in block 716, the custom query generator allows a user 202 to change, update, modify, or the like a customer query of the system to monitor one or more maintenance updates.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer program product for entity wide software tracking and monitoring, the computer program product comprising at least one non-transitory computer-readable medium having computer-readable program code portions embodied therein, the computer-readable program code portions comprising:

an executable portion configured for receiving maintenance update products;

an executable portion configured for generating tracking modules for the maintenance update products, wherein one tracking module is designated to each maintenance update product, wherein the tracking modules are self-contained and self-describing that create an executable load module in a run-time library of the maintenance update products;

an executable portion configured for creating an entity internal standard name for the maintenance update products with the incorporated tracking modules, wherein the entity internal standard name is coded for retention;

an executable portion configured for allowing user input of maintenance information into scripting language of the tracking modules designated to the maintenance update products, wherein user input of maintenance information into scripting language of the tracking modules includes contact information for an individual to receive, automatically, a generated report for the progress of a maintenance update;

an executable portion configured for incorporating the tracking modules into the maintenance update products and apply the maintenance update to a location within an information technology infrastructure of an entity;

an executable portion configured for executing the tracking modules incorporated into the maintenance update products, wherein executing the tracking modules allows the tracking modules to communicate a progress of the maintenance update that the tracking modules are incorporated therewith;

an executable portion configured for generating a report of the progress of the maintenance update based on the executed tracking module for each of one or more maintenance update products; and an executable portion configured for providing the user with the report of the progress of the maintenance update associated with the tracking modules, wherein the provided report is based on a user query for the report or user input of maintenance information into the scripting language of the tracking modules.

2. The computer program product of claim 1, further comprising an executable portion configured for presenting the user with an interface to query one or more maintenance updates in progress within the entity, wherein querying the one or more maintenance updates provides the user with the report for the progress of the one or more maintenance updates of the query.

3. The computer program product of claim 1, further comprising an executable portion configured for presenting the user with an interface to query one or more maintenance updates in progress within the entity, wherein the interface provides the user with medium to search the entity for the progress of one or more maintenance updates occurring within the entity.

4. The computer program product of claim 1, further comprising an executable portion configured for creating an entity internal standard name for the maintenance update products with the incorporated tracking modules, wherein the entity internal standard name is a file name coded for entity recognition and retention.

5. The computer program product of claim 1, wherein each tracking module is a self-contained, self-describing module assembled and link-edited as part of a job that creates an executable load module in an appropriate run-time library of the maintenance update products.

6. The computer program product of claim 1, wherein the location within the entity information technology infrastructure includes a logical partition on a mainframe associated with the entity.

7. The computer program product of claim 1, wherein the location within the entity information technology infrastructure includes a mainframe environment.

8. The computer program product of claim 1, wherein the location within the entity information technology infrastructure includes a network system.

9. The computer program product of claim 1, wherein maintenance update products include entity created software updates, fixes, or patches for software running within the entity information technology infrastructure.

10. The computer program product of claim 1, wherein maintenance update products include vendor provided software updates, fixes, or patches for software running within the entity information technology infrastructure.

11. A computer-implemented method for entity wide software tracking and monitoring, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving maintenance update products;
generating tracking modules for the maintenance update products, wherein one tracking module is designated to each maintenance update product, wherein the tracking modules are self-contained and self-describing that create an executable load module in a run-time library of the maintenance update products;
creating an entity internal standard name for the maintenance update products with the incorporated tracking modules, wherein the entity internal standard name is coded for retention;
allowing user input of maintenance information into scripting language of the tracking modules designated to the maintenance update products, wherein user input of maintenance information into scripting language of the tracking modules includes contact information for an individual to receive, automatically, a generated report for the progress of a maintenance update;
incorporating the tracking module into the maintenance update products and apply the maintenance update to a location within an information technology infrastructure of an entity;
executing the tracking modules incorporated into the maintenance update products, wherein executing the tracking modules allows the tracking modules to communicate a progress of the maintenance update that the tracking modules are incorporated therewith;
generating a report of the progress of the maintenance update based on the executed tracking module for each of one or more maintenance update products; and
providing the user with the report of the progress of the maintenance update associated with the tracking modules, wherein the provided report is based on a user query for the report or user input of maintenance information into the scripting language of the tracking modules.

12. The computer-implemented method of claim 11, further comprising presenting the user with an interface to query one or more maintenance updates in progress within the entity, wherein querying the one or more maintenance updates provides the user with the report for the progress of the one or more maintenance updates of the query.

13. The computer-implemented method of claim 11, further comprising presenting the user with an interface to query one or more maintenance updates in progress within the entity, wherein the interface provides the user with medium to search the entity for the progress of one or more maintenance updates occurring within the entity.

14. The computer-implemented method of claim 11, further comprising creating an entity internal standard name for the maintenance update products with the incorporated tracking modules, wherein the entity internal standard name is a file name coded for entity recognition and retention.

15. The computer-implemented method of claim 11, wherein each tracking module is a self-contained, self-describing module assembled and link-edited as part of a job that creates an executable load module in an appropriate run-time library of the maintenance update products.

16. The computer-implemented method of claim 11, wherein the location within the entity information technology infrastructure includes a logical partition on a mainframe associated with the entity.

17. The computer-implemented method of claim 11, wherein the location within the entity information technology infrastructure includes a mainframe environment.

18. The computer-implemented method of claim 11, wherein the location within the entity information technology infrastructure includes a network system.

19. The computer-implemented method of claim 11, wherein maintenance update products include entity created software updates, fixes, or patches for software running within the entity information technology infrastructure.

20. The computer-implemented method of claim 11, wherein maintenance update products include vendor provided software updates, fixes, or patches for software running within the entity information technology infrastructure.

* * * * *